United States Patent Office 3,500,034
Patented Mar. 10, 1970

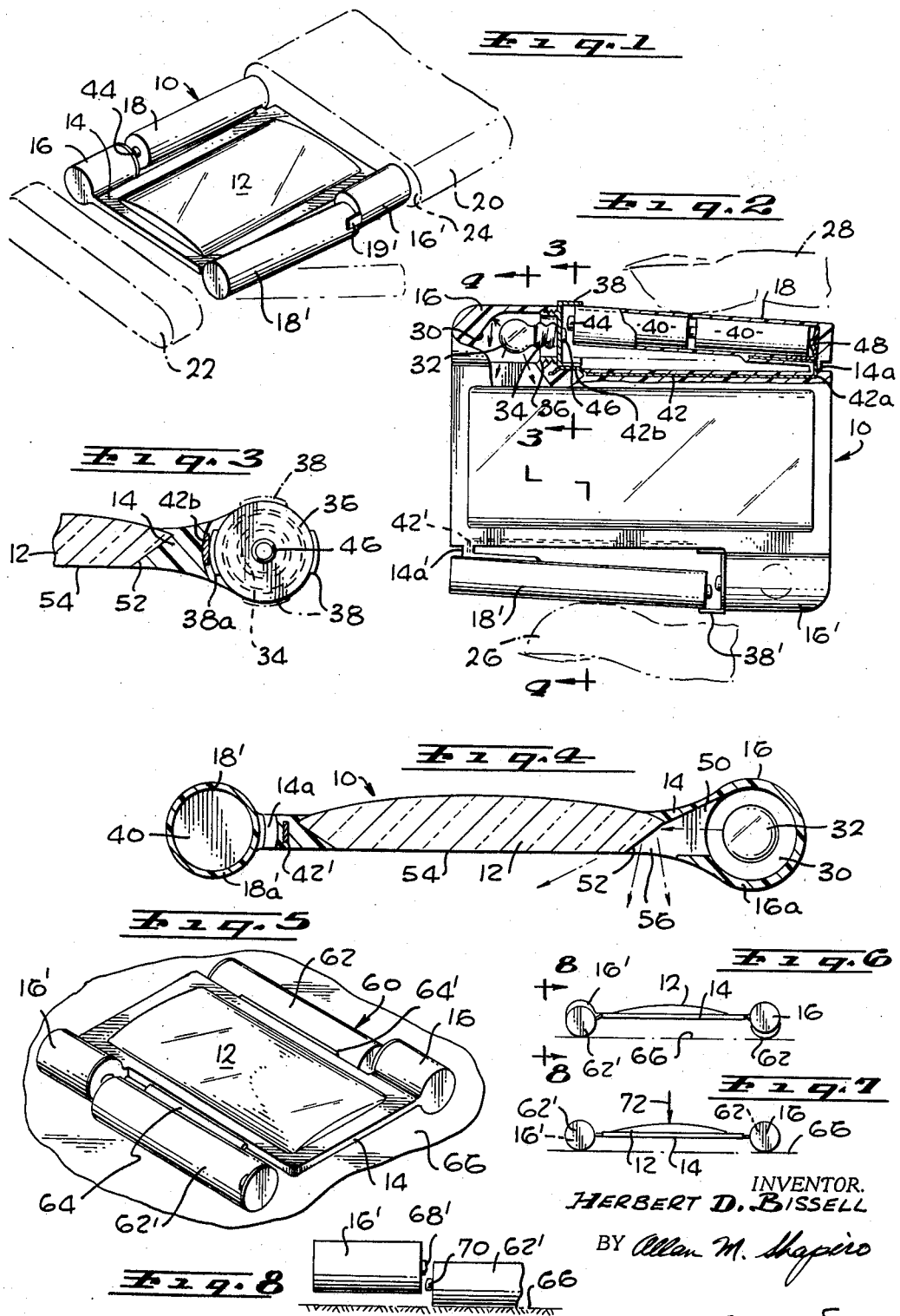

3,500,034
ILLUMINATED READING DEVICE
Herbert D. Bissell, Los Angeles, Calif.
(17220 Osborne St., Northridge, Calif. 91324)
Filed Dec. 29, 1967, Ser. No. 694,568
Int. Cl. F21v 33/06; G02b 27/02
U.S. Cl. 240—6.4
11 Claims

ABSTRACT OF THE DISCLOSURE

An illuminated reading device comprising a rectangular magnifying glass mounted in a frame having a pair of cylindrical lamp housings incorporated along opposite edges thereof. A pair of cylindrical battery shells are pivotally mounted to the frame. When pivoted into coaxial alignment, the shells and the housing together form protruding, light-containing supports for the magnifier, and batteries contained by the shells are electrically connected to bulbs within the housings. Light from the bulbs is directed through passageways interior of the frame toward slanted longitudinal edges of the glass which reflect and/or refract the light downward toward the page being read.

BACKGROUND OF THE INVENTION

Field of the invention

The present invention relates to an illuminated reading device and, more particularly, to a reading device including a magnifier having a light source contained in its frame.

Description of the prior art

A common problem experienced in darkened theaters or dimly lit restaurants is that of reading a program or menu in the existing light. While a pocket-size flashlight is a convenient aid, its use has the disadvantage of inconvenient size and shape and of spreading considerable light, often an annoyance to people in adjacent seats. Even with a flashlight, the illumination may be insufficient to permit reading of fine print.

In the past, a number of devices have been suggested to overcome this problem. For example, magnifying glasses containing lamps in their mountings have been used. In these devices, typified by U.S. Patent No. 1,909,662 and U.S. Patent No. 2,384,528, the magnifier mounting contains a lamp and an opening through which light from the lamp is directed towards the page being read. Such prior art devices, while providing both illumination and magnifying functions, have the disadvantage that the light provided is not constrained to a limited area, and thus could still provide an annoyance to nearby patrons. In addition, the light source in these patented devices requires connection to an external electric power source which, for the purpose intended, probably would not be available.

Another approach of the prior art is to provide a magnifying glass having a handle connected thereto by a light pipe such as a translucent rod. Light from a bulb contained in the handle is directed to the magnifier through the light pipe; the light then is refracted by the glass. Such devices are typified by U.S. Letters Patent Nos. 2,316,301 and 2,586,723. This approach, while convenient, suffers the disadvantage that light transmitted by the pipe is refracted both upward and downward from the magnifying glass, and not constrained only to the area of the page being read. In addition, like the aforesaid Patents Nos. 2,384,528 and 1,909,662, these prior art illuminated magnifiers each utilize an elongated handle extending from the magnifying glass. As a result, the devices are not convenient to carry. For example, such a magnifier is not easily carried in a jacket pocket or ladies' purse.

An approach toward improving the convenience of an illuminated magnifier is typified by U.S. Patent No. 2,056,693. In this device, a magnifying glass is supported between two hollow supports, each of which contains a battery and a lamp. The lamps protrude from the supports beneath the magnifier and are shielded with a shade or hood. While the device is compact, the protruding bulbs easily could be broken. Furthermore, the shades do not adequately restrict light from the bulbs to that area beneath the magnifying glass. Moreover, the device requires individual electrical switches for each lamp, thereby adding to its cost and detracting from its convenience.

The aforementioned and other shortcomings of the prior art are overcome by utilizing the inventive illuminated reading device of the present invention, wherein a unitary magnifier frame contains means for illuminating only the area directly beneath the lens. The inventive device uses a minimum of parts and no separate switches, is self-supporting above the page being read, has no extending handle, readily lends itself to packaging in a small case which conveniently may be carried in a pocket or a handbag, and is attractive in appearance.

SUMMARY OF THE INVENTION

The inventive illuminated reading device comprises a substantially rectangular magnifying glass, the longitudinal edges of which are slanted. The magnifying glass is supported in a frame, unitary with which are a pair of substantially cylindrical lamp housings situated at diagonally opposite edges of the frame. Pivotally mounted to the frame are a pair of cylindrical battery shells having the same effective diameter as the lamp housings. When the shells are pivoted into coaxial alignment with respective ones of the lamp housings, electrical contact is made between batteries in the shells and bulbs in the housings, thereby turning on the lamps. The shells and the housings together provided a protruding support for the magnifier. Only slight compression or other force is required to illuminate the scene.

The bulbs are contained in cavities within the housings which include passageways leading to the slant edges of the magnifying glass and to openings at the underside of the frame. Thus, light from the lamps is directed exclusively to the edges of the magnifying glass where it is reflected and refracted downward toward the page being read.

Thus, it is an object of the present invention to provide a compact illuminated reading device.

It is another object of the present invention to provide an illuminated reading device, including a magnifying glass and an illumination source mounted in the frame for the glass.

Yet another object of the present invention is to provide an illuminated reading device wherein batteries are connected to lamps contained within the frame of the glass by pivoting the shell containing the batteries.

A further object of the present invention is to provide a compact illuminated reading device in which a pair of battery shells and lamp housings protrude from opposite edges of a magnifying glass frame to provide both a source of illumination and a light retaining mounting for the magnifier.

Still a further object of the present invention is to provide a reading device in which light from a bulb contained in the frame of a magnifying glass is directed through a channel interior of the frame to the edge of the glass, and is reflected and refracted thereby to the page therebelow.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGURE 1 is a perspective view of one embodiment of an illuminated reading device in accordance with the present invention with a carrying case for the device illustrated in phantom;

FIGURE 2 is a top plan view, in partial section, of the device shown in FIGURE 1, illustrating various constructional details of the lamp housing and battery shell;

FIGURE 3 is an enlarged fragmentary sectional view, illustrating constructional details of the lamp mounting, as seen generally along the line 3—3 of FIGURE 2;

FIGURE 4 is an enlarged sectional view as seen generally along the line 4—4 of FIGURE 2, and illustrating details of the lamp housing interior light passageway and the edges of the magnifying glass with the device in operative position;

FIGURE 5 is a perspective view of another embodiment of the inventive illuminated reading device shown in place atop a page being read;

FIGURE 6 is an end elevation view of the device shown in FIGURE 5, illustrated with the battery shells disengaged from the lamp housings in which position the lamps are OFF;

FIGURE 7 is an end elevation view of the device shown in FIGURE 5, illustrated with the battery shells in coaxial alignment with the lamp housings, in which position the lamps are ON; and FIGURE 8 is a fragmentary elevation view of the battery shell and lamp housing components of the device of FIGURE 5, as viewed generally along the line 8—8 of FIGURE 6.

DESCRIPTION OF THE PREFERRED EMBODIMENTS

One embodiment of an illuminated reading device in accordance with the present invention is illustrated in FIGURES 1–4. Referring initially to FIGURE 1, the inventive reading device 10 is seen to comprise a substantially rectangular magnifying glass 12 mounted in frame 14. Situated at diagonally opposite ends of frame 14, and unitary therewith, is a pair of substantially cylindrical lamp housings 16 and 16'. Housings 16 and 16' contain bulbs which, as described more fully hereinbelow, provide illumination for the page being read with the inventive reading device.

Pivotally attached to frame 14 is a pair of substantially cylindrical battery shells 18 and 18'. Each battery shell 18 and 18' is adapted to hold one or more flashlight cells, which power respectively the lamps contained in housings 16 and 16'. In this embodiment, shells 18 and 18' are adapted to pivot about an axis perpendicular to the effective plane of frame 14 from the OFF position illustrated in FIGURE 1 to an operating position in which shell 18 is substantially coaxial with housing 16 and shell 18' is substantially coaxial with housing 16'. In this operational configuration, electrical contact is made between battery and bulb, providing reading illumination.

Shell 18' is provided with release member 19' which permits shell 18' to be pivoted to a position 18" (shown in phantom in FIGURE 1), at which position the batteries contained by shell 18' readily may be replaced. A similar release member for shell 18 is hidden from view in FIGURE 1.

The inventive illuminated reading device 10 may be provided with a protective, cigarette-package size carrying case, such as that illustrated in phantom at 20 in FIGURE 1. The reading device 10 may be slid into the carrying case 20 and protected by placing cover 22 over open end 24 of case 20.

Various constructional and operational details of the inventive illuminated reading device 10 are illustrated in FIGURE 2. As may be seen therein, the reading device 10 is of small size and conveniently may be held in one hand, as between thumb 26 and forefinger 28 illustrated in phantom. In a typical embodiment, magnifying glass 12 may be approximately three inches long by one inch wide.

Still referring to FIGURE 2, note that lamp housing 16 contains interior cavity or chamber 30 of sufficiently large size to receive lamp 32. If desired, the interior surface of chamber 30 may be provided with a light reflecting coating. Lamp 32 is supported by socket 34, which includes threaded member 36 adapted to be unscrewed from housing 16 when replacement of lamp 32 is necessary. Extending rearwardly of socket 34 are retaining members 38 which function to limit the travel of shell 18; preferably, members 38 are electrically conductive and, as may be seen in FIGURE 3, are positioned about the periphery of a circle. Similar members 38' limit the travel of shell 18'.

Cylindrical shell 18 is hollow and is adapted to receive one or more batteries 40. In a typical embodiment, penlight cells of the AA variety may be employed. Preferably, shell 18 is of plastic or similar electrically insulating material and may be of the same material as that used for frame 14. Shell 18 is hingeably attached to frame 14 by metal strip 42 which, for example, may comprise beryllium copper. By appropriate bending of substantially U-shaped strip 42, shell 18 effectively is spring biased to the position illustrated in FIGURE 2, in which position battery terminal 44 is not in electrical contact with terminal 46 of bulb 32.

Electrical connection from the rear terminal of battery 40 to the other threaded contact of bulb 32 is provided via terminal contact 48 which is electrically connected to adjacent portion 42a thereof. Portion 42b of strip 42 is in electrical contact with member 38a (see FIGURES 2 and 3) of socket 34, completing the circuit. To provide electrical insulation and to enhance the appearance of the device 10, portion 42a of strip 42 is enclosed within insulating member 14a. Similarly, strip 42' (associated with shell 18') is enclosed by insulating member 14a'.

To turn ON lamps 32 and 32', battery shells 18 and 18' are pivoted toward magnifying glass 12, as by squeezing together fingers 26 and 28 (see FIGURE 2). As noted earlier, this brings shells 18 and 18' into substantially coaxial alignment with housings 16 and 16'. It also brings battery terminals 44 and 45', respectively, into electrical contact with terminals 46 and 46' of lamps 32 and 32'.

The path followed by the light from bulb 32 is illustrated in FIGURES 2 and 4. As may be seen therein, cavity or chamber 30 interior of lamp housing 16 is provided with an interior passageway 50 within frame 14 extending from chamber 30 to the slanted edge 52 of magnifying glass 12. The angle of edge 52 with respect to lower surface 54 of magnifying glass 12 is selected so that light from bulb 32 is reflected angularly downward by edge 52 through opening 56 so as to illuminate the page being read. As illustrated, some of the light striking edge 52 passes through a portion of lens 12 and is refracted angularly downward and out through bottom surface 54 of magnifier 12. In this manner, the light emanating from bulb 32 is confined and restricted to illuminating a large portion of the page underneath magnifying glass 12. It should be noted and understood that edge 52 may be reflectively coated so that all of the light emanating from bulb 32 impinges upon such reflectively coated edge 52 for direct reflection therefrom in a downwardly angled manner onto the surface to be illuminated.

Another feature of the inventive illuminated reading device 10 is illustrated in FIGURE 4. Note that shell 18' (similarly shell 18) and lamp housings 16 (similarly housing 16') each have a diameter somewhat larger than the thickness of lens 12. Moreover, they are oriented with respect to frame 14 so that the lower edges 18a' and 16a extend below lower lens surface 54. Thus, edges 16a and 18a' may be placed directly on the page being read. In this position, lens 12 will be situated an appropriate distance from the page to allow effective magnification. Further, shells 18 and 18' and housings 16 and 16' together provide a light boundary so that illumination from lamps 32 and 32' is constrained between such shells and housings substantially to the area directly underneath lens 50. This permits the invention to be used, for example, in a darkened theater or restaurant with a minimum of light escaping to annnoy nearby patrons.

An alternative embodiment of the inventive illuminated reading device is illustrated in FIGURES 5–8. Referring first to FIGURE 5, note that reading device 60 includes various elements which are substantially identical to those of reading device 10 shown in FIGURES 1–4, and bear the same reference characters, such as magnifying glass 12, frame 14, and lamp housings 16 and 16'. However, in the embodiment of FIGURES 5–8, battery shells 62 and 62' are pivotally attached to frame 14 by means of hinge members 64 and 64' which permit pivotal motion about an axis parallel to the plane of frame 14.

As shown in FIGURES 5 and 6, the inventive reading device 60 is disposed atop a menu or program 66 being read, with battery shells 62 and 62' situated in the OFF position. In this OFF position, battery terminal 70 does not make electrical contact with corresponding lamp terminal 68', due to the offset of battery shell 62' from lamp housing 16', as illustrated in FIGURE 8.

When a slight downward pressure (indicated schematically by arrow 72 in FIGURE 7) is applied to the inventive illuminated reading device 60, battery shells 62 and 62' are forced to pivot about hinges 64 and 64'. This brings shells 62 and 62' into substantially coaxial alignment with lamp housings 16 and 16'. In this position, illustrated in FIGURE 7, electrical contact between the batteries and the lamps is effected, thereby turning ON the lamps.

It should be noted that the same effects of light confinement to the illuminated surface are attained with the latter discussed embodiment as mentioned more specifically in connection with the former embodiment.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. A reading device comprising:
a substantially rectangular magnifying glass having longitudinal edges, at least one of said edges being slanted;
a frame surrounding said glass;
at least one substantially cylindrical lamp housing, unitary with said frame, and in parallel spaced apart relationship with said slanted longitudinal edge, said frame including a passageway between the interior of said housing and said slanted longitudinal edge;
a lamp within said housing whereby light from said lamp is directed through said passageway to said slanted edge; and
at least one substantially cylindrical shell adapted to receive a battery and being attached to said frame and adapted for piovtal coaxial alignment with said housing, said alignment effecting electrical connection between said battery and said lamp.

2. The device defined in claim 1 wherein:
said shell is adapted to pivot about an axis parallel to the plane of said frame.

3. The device defined in claim 1 wherein:
said shell is adapted ot pivot about an axis perpendicular to the plane of said frame.

4. The device defined in claim 1 wherein:
said glass has a second longitudinal slanted edge opposite said first mentioned slanted edge;
each said lamp housing, lamp and shell constitutes a respective first one thereof; and further including a second lamp housing, second lamp and second shell, each being identical to its said respective first one thereof and disposed oppositely thereto for directing light to said second slanted edge.

5. The device defined in claim 4 wherein:
the outside diameter of each of said shells is substantially equal to the outside diameter of each of said housings.

6. The devices defined in claim 5 wherein:
the axes of said housings are parallel, and wherein;
said housings are situated adjacent diagonally opposite corners of said frame.

7. The device defined in claim 6 wherein:
said diameters are greater than the thickness of said frame whereby said shells and said housings together provide a downwardly protruding base for said device.

8. An illuminated reading device adapted to be held in the hand, said device comprising:
a substantially rectangular magnifying glass having one planar surface and one convex surface, the longitudinal edges of said glass being slanted at an obtuse angle with respect to said planar surface;
a frame surrounding said glass, said frame including first and second substantially cylindrical members extending from opposite longitudinal outer edges of said frame, said members each having an interior cavity adapted to house a bulb, said frame including first and second passageways extending the cavities of respective first and second members to respective longitudinal edges of said glass, said passageways each including an opening adjacent the apex of said planar surface and said slanted edge; and
first and second substantially cylindrical shells, each adapted to receive at least one battery, said shells respectively being pivotally attached to said opposite longitudinal edges of said frame, whereby said shells can be pivoted into coaxial alignment with said members.

9. The device defined in claim 8 further comprising:
first and second lamp sockets, each adapted for threaded, coaxial engagement with a respective one of said members, each of said sockets adapted to hold a bulb within the cavity of its respective member.

10. The device defined in claim 9 wherein:
a central contact of said socket extends rearwardly coaxially thereof, whereby electrical contact is made between said central contact and a terminal of said battery when said shell is coaxially aligned with said member.

11. The device defined in claim 10 further comprising:
first and second substantially U-shaped, electrically conductive, resilient strips, a first end of each of said strips engaging a respective one of said shells peripherally longitudinally rearwardly thereof, the other end of each of said strips engaging said frame longitudinally thereof, each of said strips completing an electrical path between said battery and said lamp.

References Cited

UNITED STATES PATENTS 2,316,301   4/1943   Ullman _____ 240—6.4 X
2,384,528   9/1945   Brandt et al.
2,787,937   4/1957   Prisament _____ 240—6.4 X NORTON ANSHER, Primary Examiner A. MATHEWS, Assistant Examiner U.S. Cl. X.R.
350—235, 256